(12) United States Patent
Kanda et al.

(10) Patent No.: US 11,992,972 B2
(45) Date of Patent: May 28, 2024

(54) SPECTACLE LENS PROCESSING DEVICE AND NON-TRANSITORY COMPUTER-READABLE MEDIUM STORING COMPUTER-READABLE INSTRUCTIONS

(71) Applicant: NIDEK CO., LTD., Gamagori (JP)

(72) Inventors: Yuji Kanda, Gamagori (JP); Kyoji Takeichi, Gamagori (JP); Hirohisa Mizuno, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 1509 days.

(21) Appl. No.: 16/220,765

(22) Filed: Dec. 14, 2018

(65) Prior Publication Data
US 2019/0118498 A1    Apr. 25, 2019

Related U.S. Application Data

(63) Continuation of application No. PCT/JP2017/020217, filed on May 31, 2017.

(30) Foreign Application Priority Data

Jul. 1, 2016  (JP) ................................ 2016-131431
Jul. 1, 2016  (JP) ................................ 2016-131432

(51) Int. Cl.
*B28D 7/00* (2006.01)
*B23B 41/00* (2006.01)
(Continued)

(52) U.S. Cl.
CPC .............. *B28D 7/005* (2013.01); *B23B 41/00* (2013.01); *B24B 9/14* (2013.01); *B24B 9/148* (2013.01);
(Continued)

(58) Field of Classification Search
USPC .............................................. 33/28; 29/26 A
See application file for complete search history.

(56) References Cited

U.S. PATENT DOCUMENTS 4,988,185 A * 1/1991 Feinbloom ............... A61B 3/04
                                                               351/231
6,790,124 B2 * 9/2004 Shibata ..................... B24B 9/14
                                                                 451/5
(Continued)

FOREIGN PATENT DOCUMENTS

JP      2003-145328 A      5/2003
JP      2004009201 A  *   1/2004 ............. B28D 1/143
(Continued)

OTHER PUBLICATIONS

Jan. 30, 2020 Extended Search Report issued in European Patent Application No. 17819751.3.
(Continued)

*Primary Examiner* — George B Bennett
(74) *Attorney, Agent, or Firm* — Oliff PLC

(57) ABSTRACT

A spectacle lens processing device includes a drilling tool and a processor. The processor acquires a position of a hole formed in a lens and a pantoscopic angle. The pantoscopic angle is an angle in a vertical plane between a visual axis of a user and an optical axis of the lens when the user wears spectacles in which the lens after processing is mounted and faces forward. The processor determines, based on the acquired pantoscopic angle, a relative angle between the drilling tool and the lens when the hole is formed in the lens in the position of the hole.

11 Claims, 9 Drawing Sheets

(51) Int. Cl.
  *B24B 9/14* (2006.01)
  *B24B 13/01* (2006.01)
  *B26F 1/16* (2006.01)
  *B28D 1/14* (2006.01)
  *B28D 7/04* (2006.01)
  *G02C 7/02* (2006.01)
  *G02C 13/00* (2006.01)

(52) U.S. Cl.
  CPC ............... *B24B 13/01* (2013.01); *B26F 1/16* (2013.01); *B28D 1/143* (2013.01); *B28D 7/043* (2013.01); *G02C 7/024* (2013.01); *G02C 13/003* (2013.01); *G02C 13/005* (2013.01)

(56) References Cited

U.S. PATENT DOCUMENTS

| | | | | |
|---|---|---|---|---|
| 7,322,082 | B2 * | 1/2008 | Natsume | B23C 3/12 408/97 |
| 7,424,773 | B2 * | 9/2008 | Obayashi | B28D 1/143 409/84 |
| 7,463,944 | B2 * | 12/2008 | Schaeffer | B28D 1/143 451/5 |
| 7,500,315 | B2 * | 3/2009 | Takeichi | B24B 9/148 33/28 |
| 7,617,579 | B2 * | 11/2009 | Natsume | B24B 9/146 451/7 |
| 9,529,212 | B2 * | 12/2016 | Haddadi | G02C 13/005 |
| 2003/0087584 | A1 | 5/2003 | Shibata | |
| 2006/0178086 | A1 | 8/2006 | Shibata | |
| 2006/0240747 | A1 | 10/2006 | Natsume et al. | |
| 2007/0201002 | A1 | 8/2007 | Takeichi | |
| 2007/0203610 | A1 | 8/2007 | Takeichi | |
| 2008/0131222 | A1 | 6/2008 | Schaeffer | |
| 2008/0186446 | A1 * | 8/2008 | Takeichi | B24B 9/148 351/110 |
| 2008/0218690 | A1 | 9/2008 | Takeichi | |
| 2022/0397389 | A1 * | 12/2022 | Teodorovic | G01B 11/06 |

FOREIGN PATENT DOCUMENTS

| | | |
|---|---|---|
| JP | 2006-189659 A | 7/2006 |
| JP | 2007-229861 A | 9/2007 |
| JP | 2008-030181 A | 2/2008 |

OTHER PUBLICATIONS

Aug. 29, 2017 International Search Report issued in International Patent Application No. PCT/JP2017/020217.
Aug. 29, 2017 Written Opinion of the International Searching Authority issued in International Patent Application No. PCT/JP2017/020217.

* cited by examiner

SPECTACLE LENS PROCESSING DEVICE AND NON-TRANSITORY COMPUTER-READABLE MEDIUM STORING COMPUTER-READABLE INSTRUCTIONS

CROSS-REFERENCE TO RELATED APPLICATION

This application is a continuation application of International Application No. PCT/JP2017/020217, filed May 31, 2017, which claims priority from Japanese Patent Application Nos. 2016-131431, filed Jul. 1, 2016, and 2016-131432, filed Jul. 1, 2016. The disclosure of the foregoing applications is hereby incorporated by reference in their entirety.

BACKGROUND

The present disclosure relates to a spectacle lens processing device capable of forming a hole in a lens for spectacles, and a non-transitory computer-readable medium storing computer-readable instructions for generating processing control data of the spectacle lens processing device.

In order to attach a rimless frame (also known as a two-point frame) to a lens for spectacles, a spectacle lens processing device is known that can form a hole in a lens. For example, a spectacle lens processing device disclosed in Patent Literature 1 determines an angle of a hole formed in a lens such that the hole is vertical with respect to an angle of the surface of the lens at a position at which the hole is formed. A spectacle lens processing device disclosed in Patent Literature 2 determines an angle of a hole formed in a lens such that the hole is vertical with respect to an angle of a surface of a demonstration lens on which a rimless frame is mounted. In addition, in the spectacle lens processing device in Patent Literature 2, an operator can set, as desired, a tilt angle in a lateral direction (an X axis direction) of the hole formed in the lens and a tilt angle in a vertical direction (a Y axis direction), respectively.

SUMMARY

In order to improve the vision of a user when the user wears spectacles, a line of sight (a visual axis) of the user and an optical axis of a lens are preferably as close to each other as possible. When the spectacles are adjusted to fit the user, the line of sight of the user and the optical axis of the lens come close to each other more easily if a pantoscopic angle is adjusted. For example, when the user looks at an object at a close distance, the line of sight of the user is more likely to tilt further downward than a horizontal direction. Thus, with near vision spectacles used mainly to look at objects at a close distance, there is a case in which the pantoscopic angle is adjusted such that the optical axis of the lens is tilted downward (namely, such that the lens is tilted forward) with respect to the visual axis of the user when looking forward.

In a method that determines an angle of a hole in accordance with a shape of the lens (an angle of a surface of a lens to be processed or a demonstration lens, for example) only, an operator cannot adjust the pantoscopic angle. On the other hand, in a method that sets the angle of the hole as desired, the operator can set the angle of the hole while taking the pantoscopic angle into account. However, in this case, a content to set the angle of the hole, a procedure to make settings, a procedure to determine a numerical value to be set, and the like are complex. Thus, with a conventional spectacle lens processing device, it is difficult to appropriately form, in the lens, the hole of an angle that takes the pantoscopic angle into account.

The spectacle lens processing device may form the hole in the lens using a drilling tool, in a state in which the lens is sandwiched and held by a lens holding shaft. In this case, depending on a held state of the lens by the lens holding shaft, the angle of the held lens can change. For example, the angle of the held lens can change between a case in which the lens is held by the lens holding shaft at an optic center (optical center) of the lens, and a case in which the lens is held by the lens holding shaft at a position other than the optic center of the lens. In the conventional spectacle lens processing device, when the angle of the held lens is changed, it is difficult to form the hole of a target angle in the lens.

Embodiments of the broad principles derived herein provide a spectacle lens processing device and a non-transitory computer-readable medium storing computer-readable instructions to form a hole of an appropriate angle in a lens.

Embodiments provide a spectacle lens processing device that includes a drilling tool that forms a hole in a lens, and a processor. The processor acquires a position of the hole formed in the lens, acquires a pantoscopic angle, the pantoscopic angle being an angle in a vertical plane between a visual axis of a user and an optical axis of the lens when the user wears spectacles in which the lens after processing is mounted and faces forward, and determines, based on the acquired pantoscopic angle, a relative angle between the drilling tool and the lens when the hole is formed in the lens in the position of the hole.

Embodiments further provide a spectacle lens processing device that includes a drilling tool that forms a hole in a lens, lens holding shafts that sandwiches and holds the lens, and a processor. The processor acquires a position of the hole formed in the lens, and determines, based on an angle of the lens held by the lens holding shafts, a relative angle between the drilling tool and the lens when the hole is formed in the lens in the position of the hole.

Embodiments also provide a non-transitory computer-readable medium storing computer-readable instructions that, when executed by a processor of a data generation device to generate processing control data used in a spectacle lens processing device including a drilling tool that forms a hole in a lens, cause the data generation device to perform processes including: acquiring a position of the hole formed in the lens, acquiring a pantoscopic angle, the pantoscopic angle being an angle in a vertical plane between a visual axis of a user and an optical axis of the lens when the user wears spectacles in which the lens after processing is mounted and faces forward; and determining, based on the acquired pantoscopic angle, a relative angle between the drilling tool and the lens when the hole is formed in the lens in the position of the hole.

Embodiments also provide a non-transitory computer-readable medium storing computer-readable instructions that, when executed by a processor of a data generation device to generate processing control data used in a spectacle lens processing device including: a drilling tool that forms a hole in a lens; and lens holding shafts that sandwiches and holds the lens, causes the data generation device to perform processes comprising: acquiring a position of the hole formed in the lens; and determining, based on an angle of the lens held by the lens holding shafts, a relative angle between the drilling tool and the lens when the hole is formed in the lens in the position of the hole.

DETAILED DESCRIPTION

Overview

Figure 1:
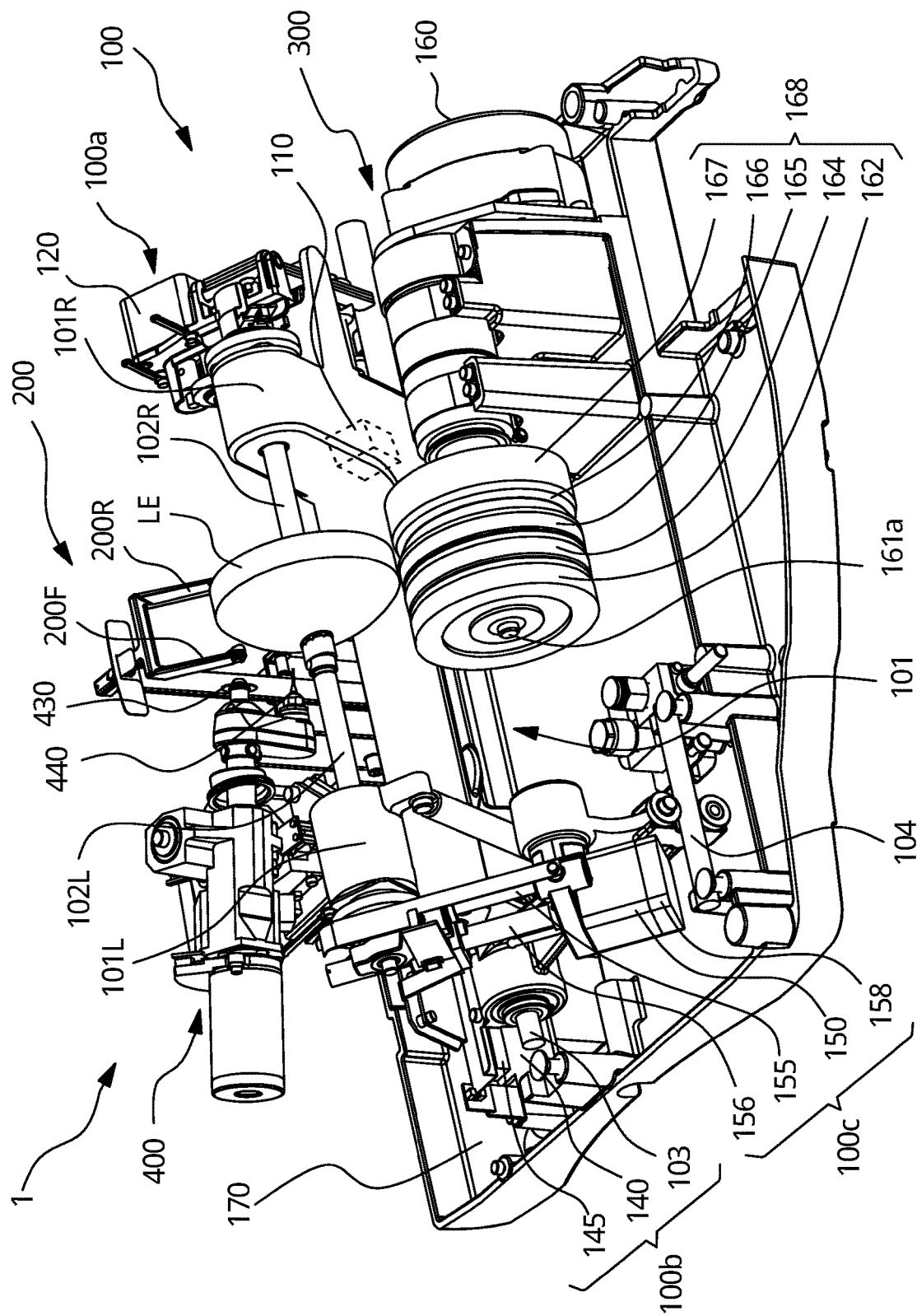
FIG. 1 is an overall configuration view of a processing mechanism of a spectacle lens processing device 1.

A first aspect of the spectacle lens processing device exemplified in the present disclosure includes a control unit that controls processing. The control unit acquires a position of a hole formed in a lens and a pantoscopic angle. The pantoscopic angle is an angle in a vertical plane between a visual axis of a user and an optical axis of the lens when the user wears spectacles in which the lens after processing is mounted and faces forward. The control unit determines, based on the acquired pantoscopic angle, a relative angle (hereinafter also referred to as a "hole angle") between a drilling tool and the lens when the hole is formed in the acquired position of the hole. Thus, the hole of the angle that takes account of the pantoscopic angle can be formed appropriately in the lens.

The control unit may acquire the pantoscopic angle specified by an operator operating an operation unit. In this case, an operator can easily and appropriately cause the spectacle lens processing device to form the hole at a desired pantoscopic angle.

A method by which the operator specifies the pantoscopic angle may be selected as appropriate. For example, a method may be adopted in which the operator directly inputs a value of the pantoscopic angle, a method in which the operator selects one of a plurality of candidate values for the pantoscopic angle (5 degrees, 10 degrees, 15 degrees and the like, for example), a method in which the operator selects one of a plurality of usage modes of the spectacles (for far vision, habitual use, for near vision, and the like, for example), or the like. When one of the usage modes of the spectacles is specified, the pantoscopic angles may be associated in advance with the respective usage modes (5 degrees for far vision, 10 degrees for habitual use, 15 degrees for near vision, and the like, for example). The control unit may determine the hole angle on the basis of one appropriate pantoscopic angle set in advance, without using the pantoscopic angle specified by the operator.

The control unit may determine the relative angle between a drilling tool and the lens, based on one of a shape of the lens to be processed and a shape of a demonstration lens mounted in a rimless frame, on the position of the hole, and on the pantoscopic angle. In this case, the hole angle that suits the shape of the lens to be processed or the demonstration lens and that takes the pantoscopic angle into account can be appropriately determined.

More specifically, the control unit may determine a provisional relative angle to which information of the pantoscopic angle is not applied, based on one of the shape of the lens to be processed and the shape of the demonstration lens mounted in a rimless frame, and on the position of the hole. The control unit may determine the relative angle when the hole is actually formed, by correcting the provisional relative angle based the acquired pantoscopic angle.

A method to determine the provisional relative angle may be changed as appropriate. For example, a method may be adopted in which the angle of the hole is perpendicular with respect to the surface of the lens at the position of the hole in the lens (the lens to be processed or the demonstration lens), a method in which the angle of the hole with respect to an angle of a lens edge portion is a predetermined angle, or the like. The relative angle may be directly determined on the basis of the lens shape, the position of the hole, and the pantoscopic angle, without performing a procedure to determine the provisional relative angle.

The control unit may acquire a camber angle. The camber angle may be an angle in a horizontal plane between the visual axis of the user and the optical axis of the lens when the user wears the spectacles in which the lens after processing is mounted and faces forward. The control unit may correct, based on the pantoscopic angle and the camber angle, a deviation in an astigmatic axis of the lens that changes in accordance with the pantoscopic angle. When the pantoscopic angle is applied, the larger the camber angle is, the more likely the astigmatic axis is to deviate. Thus, by taking the pantoscopic angle and the camber angle into account, the deviation of the astigmatic axis can be appropriately corrected. As a result, even when the pantoscopic angle is adjusted, an occurrence of the deviation of the astigmatic axis can be suppressed.

A method to correct the deviation of the astigmatic axis may be selected as appropriate. For example, the deviation of the astigmatic axis may be corrected by correcting an angle in a rotation direction of the lens when the lens is held by lens chuck shafts. The deviation of the astigmatic axis may be corrected by correcting the relative angle (the hole angle) between the drilling tool and the lens. The deviation of the astigmatic axis may be corrected by correcting the hole angle and a position of the hole.

The control unit may limit an adjustable range of the pantoscopic angle, in accordance with a type of fastening of the rimless frame. For example, when the fastening fixes the lens at the single hole, the pantoscopic angle can be easily adjusted by adjusting the hole angle. Meanwhile, with the fastening that fixes the lens at a plurality of the holes aligned vertically, it may be difficult to adjust the pantoscopic angle. By limiting the adjustable range of the pantoscopic angle in accordance with the type of the fastening, a possibility can be reduced of the hole that is not suited to the type of the fastening being formed in the lens.

A second aspect of the spectacle lens processing device exemplified in the present disclosure includes a control unit that controls operation. The control unit acquires a position of a hole formed in a lens. The control unit determines, based on an angle of the lens held by lens holding shafts, a relative angle between a drilling tool and the lens when the hole is formed in the acquired position of the hole. As a result, an impact of a change in the angle of the lens held by the lens holding shafts can be reduced, and the hole of the appropriate angle can be formed in the lens.

The control unit may acquire angle information of the lens, the angle information being obtained by measuring a shape of the lens held by the lens holding shafts. The control unit may determine the relative angle based on the angle information. In this case, the impact of the change in the angle of the lens held by the lens holding shafts can be more appropriately reduced.

A method to acquire the angle information of the held lens may be selected as appropriate. For example, a spherical surface shape of the lens surface of the held lens may be measured by a lens shape measurement device. In this case, the control unit may apply a virtual sphere to the measured lens surface, and may identify a virtual line that passes through a center position of the applied sphere and a position (a chuck position) of the lens held by the lens holding shafts. The control unit may acquire the angle information on the basis of the angle of the virtual line. Positions of a plurality of points on an edge portion of the held lens may be measured by the lens shape measurement device. In this case, the control unit may calculate a virtual plane that passes through positions of the plurality of measured points, and may acquire the angle information on the basis of the angle of the plane.

The control unit may determine the relative angle between the drilling tool and the lens without acquiring the angle information of the lens. In this case, for example, the control unit may determine the relative angle between the drilling tool and the lens as the appropriate angle, by adjusting at least one of the angle of the drilling tool and the angle of the lens holding shafts until the relative angle between the lens and the drilling tool is the appropriate angle.

the control unit may acquire, as the angle information, a deviation of an angle of the lens actually held by the lens holding shafts, with respect to an angle of the lens when the lens is held at an optic center of the lens by the lens holding shafts. The control unit may determine the relative angle based on the acquired deviation of the angle. In this case, even when the lens is held at a position other than the optic center, the impact of the change in the angle of the lens can be appropriately suppressed.

A method to acquire the deviation of the angle of the lens may be selected as appropriate. For example, the control unit may acquire a deviation in an angle between the above-described virtual line and the lens holding shafts as the deviation in the angle of the lens. The control unit may acquire, as the deviation of the angle of the lens, a deviation between a perpendicular line that is perpendicular with respect to the above-described virtual plane and the angle of the lens holding shafts.

The control unit may determine a provisional relative angle between the drilling tool and the lens when the lens is held at the optic center of the lens by the lens holding shafts, and may determine the relative angle when the hole is actually formed, by correcting the determined provisional relative angle in accordance with the deviation of the angle. In this case, even when the lens is held at the position other than the optic center, the impact of the change of the angle of the lens can be appropriately suppressed.

When the relative angle between the drilling tool and the lens is determined, it is not necessary to always use the angle of the drilling tool and the angle of the lens held by the lens holding shafts to determine the relative angle. For example, by determining the angle of the drilling tool and the angle of the lens holding shafts, the control unit may determine the relative angle between the drilling tool and the lens held by the lens holding shafts. When the angle of the lens held by the lens holding shafts is changed, the control unit may determine the relative angle between the drilling tool and the lens, using the angle of the drilling tool, the angle of the held lens, and the angle of the lens holding shafts. Thus, irrespective of a specific method to determine the angle, the hole of the appropriate angle can be formed in the lens as long as the relative angle between the drilling tool and the lens is the appropriate angle.

Embodiments

Hereinafter, an exemplary embodiment according to the present disclosure will be explained with reference to the drawings. As shown in FIG. 1, a spectacle lens processing device 1 of the present embodiment includes a lens holding unit 100, a lens shape measurement unit 200, a first processing tool unit 300, and a second processing tool unit 400.

The lens holding unit 100 includes lens holding shafts (lens chuck shafts) 102R and 102L that sandwiches and holds a lens LE. Further, the lens holding unit 100 includes a lens rotation unit 100a, a holding shaft movement unit 100b, and an inter-shaft distance changing unit 100c.

The lens rotation unit 100a causes the pair of lens holding shafts 102R and 102L to axially rotate. The holding shaft movement unit 100b moves the lens holding shafts 102R and 102L in the axis direction (here, an X direction). The inter-shaft distance changing unit 100c causes the lens holding shafts 102R and 102L to move in a direction (here, a Y direction) to approach or move away from a rotating shaft of a processing tool (to be described in detail below) of each of the first processing tool unit 300 and the second processing tool unit 400. Further, the inter-shaft distance changing unit 100c changes a distance between the lens shape measurement unit 200 and the lens holding shafts 102R and 102L.

An specific example of each configuration of the spectacle lens processing device 1 will be explained in detail below. The lens holding unit 100 is mounted on a base 170 of a main body of the spectacle lens processing device 1.

The lens rotation unit 100a will be explained. The lens holding shaft 102R is held on a right arm 101R of a carriage 101 of the lens holding unit 100, and the lens holding shaft 102L is held on a left arm 101L, such that the lens holding shafts 102R and 102L are each rotatable and they are coaxial with each other. When the lens holding shaft 102R is moved to the lens holding shaft 102L side by a motor 110 attached to the right arm 101R, the lens LE is sandwiched between and held by the two lens holding shafts 102R and 102L. The two lens holding shafts 102R and 102L are rotated in synchronization by a motor 120 attached to the right arm 101R.

The holding shaft movement unit 100b will be explained. An X axis movement support base 140 is provided on shafts 103 and 104 that extend in parallel to the lens holding shafts 102R and 102L and a grindstone rotating shaft 161a. The X axis movement support base 140 can move in the X direction along the shafts 103 and 104, due to the power of an X axis movement motor 145. The carriage 101 is mounted on the X axis movement support base 140. An encoder 146 (refer to FIG. 3) is provided on a rotating shaft of the X axis movement motor 145. In the present embodiment, positions in the X direction of the lens holding shafts 102R and 102L detected by the encoder 146 are used to measure the shape of a front surface and a rear surface of the lens LE.

The inter-shaft distance changing unit 100c will be explained. A shaft 156 that extends in a direction joining the lens holding shafts 102R and 102L and the grindstone rotation shaft 161a is fixed to the X axis movement support base 140. A ball screw 155 that extends in the Y direction rotates due to the rotation of a Y axis movement motor 150. As a result, the carriage 101 moves in the Y direction along the shaft 156. An encoder 158, which detects the position in the Y direction of the carriage 101, is provided on a rotating shaft of the Y axis movement motor 150.

The lens shape measurement unit 200 will be explained. The lens shape measurement unit 200 of the present embodiment is fixed to the base 170, in a position on the opposite side to the first processing tool unit 300 on the other side of the carriage 101. The lens shape measurement unit 200 includes a lens edge position measurement portion 200F, and a lens edge position measurement portion 200R. The lens edge position measurement portion 200F has a probe that is caused to come into contact with the front surface of the lens LE. The lens edge position measurement portion 200R has a probe that is caused to come into contact with the rear surface of the lens LE. In a state in which the respective probes of the lens edge position measurement portions 200F and 200R are in contact with the front surface and the rear surface of the lens LE, the carriage 101 is moved in the Y direction on the basis of lens shape data, the lens holding shafts 102R and 102L are rotated, and thus edge positions of the front surface and the rear surface of the lens LE are simultaneously measured. A configuration or the like disclosed in Japanese Patent Application Publication No. 2003-145328 may be used as the configuration of the lens edge position measurement portions 200F and 200R, for example.

The first processing tool unit 300 will be explained. The first processing tool unit 300 includes a circumferential rim processing tool 168 that is one of the lens processing tools. The circumferential rim processing tool 168 of the present embodiment includes a rough grindstone for glass 162, a finishing grindstone 164 that has a V groove (a V-shape groove) that forms a V shape in the lens and a flat processing surface, a flat mirror finishing grindstone 165, a high-curve lens finishing grindstone 166, a rough grindstone for plastic 167, and the like. The plurality of grindstones of the circumferential rim processing tool 168 are coaxially attached to the grindstone rotating shaft (grindstone spindle) 161a. The grindstone rotating shaft 161a is rotated by a motor 160. The circumferential rim of the lens LE held by the lens holding shafts 102R and 102L is processed by being brought into pressure contact with the first lens processing tool 168.

Figure 2:
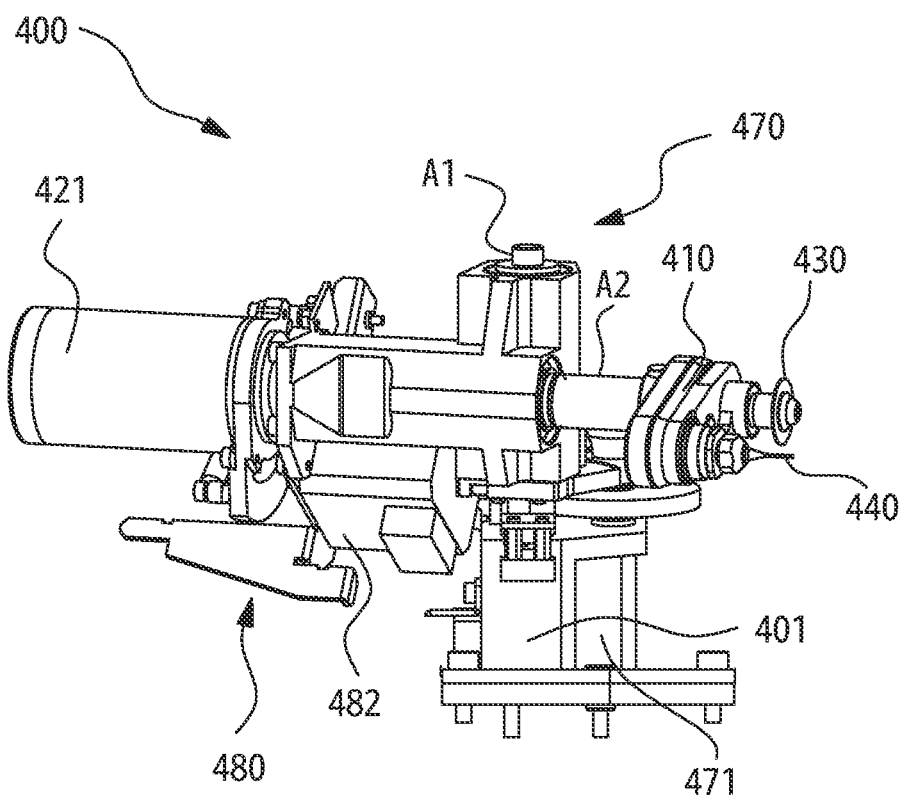
FIG. 2 is a view showing a second processing tool unit 400 from the side.

The second processing tool unit 400 will be explained. As shown in FIG. 2, the second processing tool unit 400 includes a finishing tool 430, a drilling tool 440, a first turning unit 470, a second turning unit 480, a motor 421, and the like. The finishing tool 430 and the drilling tool 440 are coupled and held by a holding portion 410. The finishing tool 430 performs finishing processing (at least one of groove cutting, V-edge forming, step forming processing, and the like, for example) on the circumferential rim of the lens LE, by rotating axially around a rotating shaft thereof.

The drilling tool 440 forms a hole in the lens LE. By moving in the axial direction while rotating axially around a rotating shaft thereof, the drilling tool 440 of the present embodiment forms the hole, which extends in the axial direction, in the lens LE. Thus, an angle of the hole formed in the lens LE changes in accordance with a relative angle between the rotating shaft of the drilling tool 440 and the lens LE. In other words, in the present embodiment, the angle of the hole formed in the lens LE is determined in accordance with a drilling direction (the axial direction of the rotating shaft in the present embodiment) of the drilling tool 440 with respect to the lens LE. However, the configuration of the drilling tool 440 may be changed as appropriate. For example, a drilling tool may be used that forms the hole in the lens LE by irradiating a laser. In this case, the drilling direction is an irradiation direction of the laser. A drilling tool may be used that forms the hole in the lens LE by discharging water at high pressure. In this case, the drilling direction is the discharge direction of the water.

The rotating shaft of the drilling tool 440 of the present embodiment is coupled to the rotating shaft of the finishing tool 430, via a clutch (not shown in the drawings), inside the holding portion 410. The rotating shaft of the finishing tool 430 rotates when the motor 421 rotates in one direction. When the motor 421 rotates in the reverse direction, a transmission destination of the power of the motor 421 is changed by the clutch to the rotating shaft of the drilling tool 440, and the rotating shaft of the drilling tool 440 rotates.

The first turning unit 470 includes a motor 471. When the motor 471 rotates, the finishing tool 430 and the drilling tool 440 turn around a turning shaft A1 that extends in a substantially vertical direction. The second turning unit 480 includes a motor 482. When the motor 482 rotates, the finishing tool 430 and the drilling tool 440 turn around a turning shaft A2 that is not parallel to the turning shaft A1. As a result, by driving the first turning unit 470 and the second turning unit 480, the spectacle lens processing device 1 of the present embodiment can change the angle of the drilling tool 440 with respect to the lens LE. Specifically, the spectacle lens processing device 1 of the present embodiment changes the relative angle between the drilling tool 440 and the lens LE by changing the drilling direction of the drilling tool 440 (the axial direction of the rotating shaft of the drilling tool 440 in the present embodiment), in a state in which the angle of the lens LE is fixed.

However, a method to change the relative angle between the drilling tool 440 and the lens LE may be changed as appropriate. For example, the spectacle lens processing device 1 may change the relative angle between the drilling tool 440 and the lens LE by changing an angle of the lens holding shafts 102R and 102L (the axial direction of the lens holding shafts 102R and 102L) in a state in which the drilling direction of the drilling tool 440 is fixed. The spectacle lens processing device 1 may change both the drilling direction of the drilling tool 440 and the angle of the lens holding shafts 102R and 102L.

Figure 3:
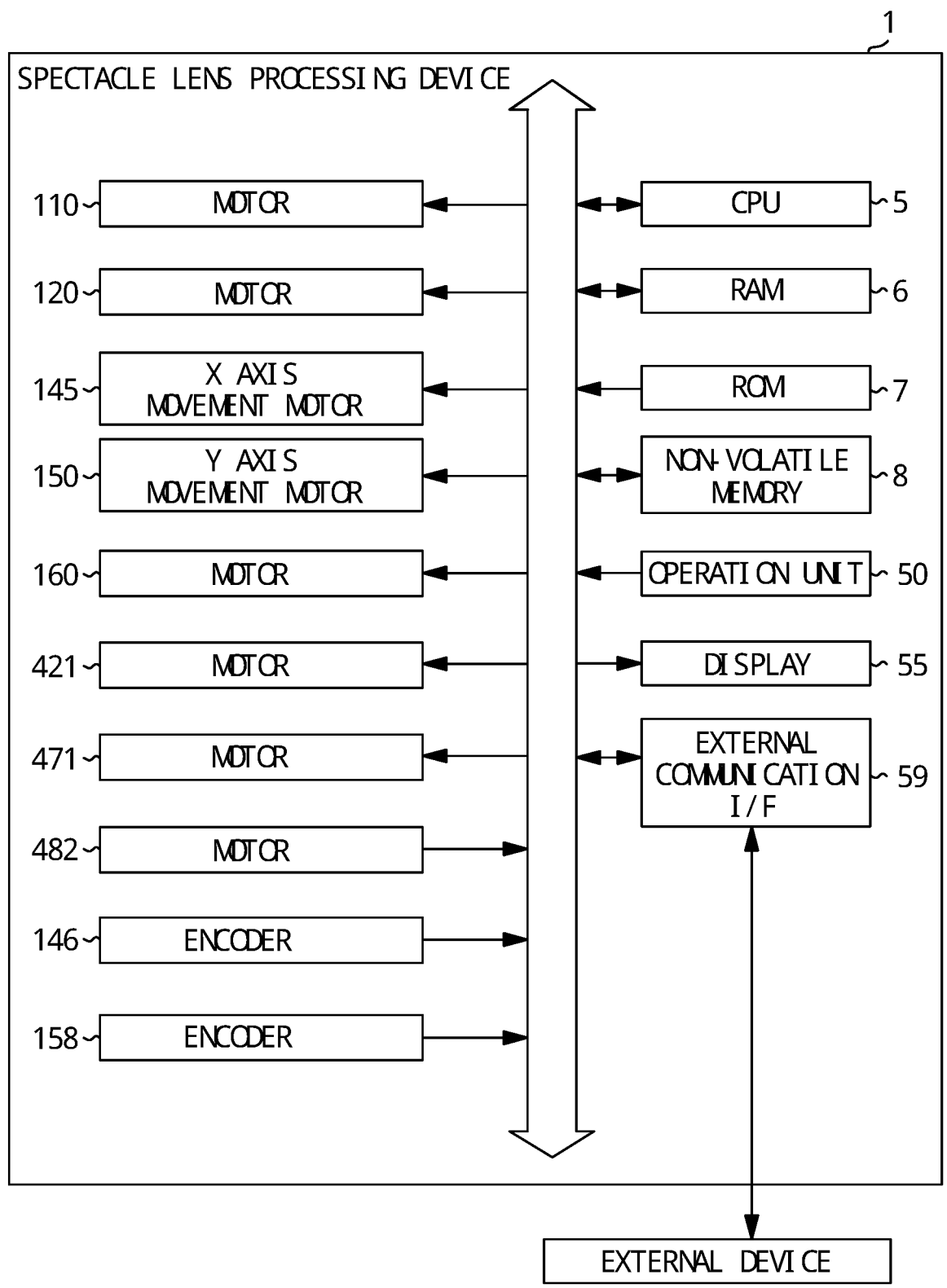
FIG. 3 is a block diagram showing an electrical configuration of the spectacle lens processing device 1.

The electrical configuration of the spectacle lens processing device 1 will be explained with reference to FIG. 3. The spectacle lens processing device 1 includes a CPU (processor) 5 that controls the spectacle lens processing device 1. The CPU 5 is connected via a bus to a RAM 6, a ROM 7, a non-volatile memory 8, an operation unit 50, a display 55, and an external communication I/F 59. In addition, the CPU 5 is connected via the bus to various devices such as the above-described motors and the like (the motor 110, the motor 120, the X axis movement motor 145, the Y axis movement motor 150, the motor 160, the motor 421, the motor 471, the motor 482, the encoder 146, and the encoder 158).

Figure 4:
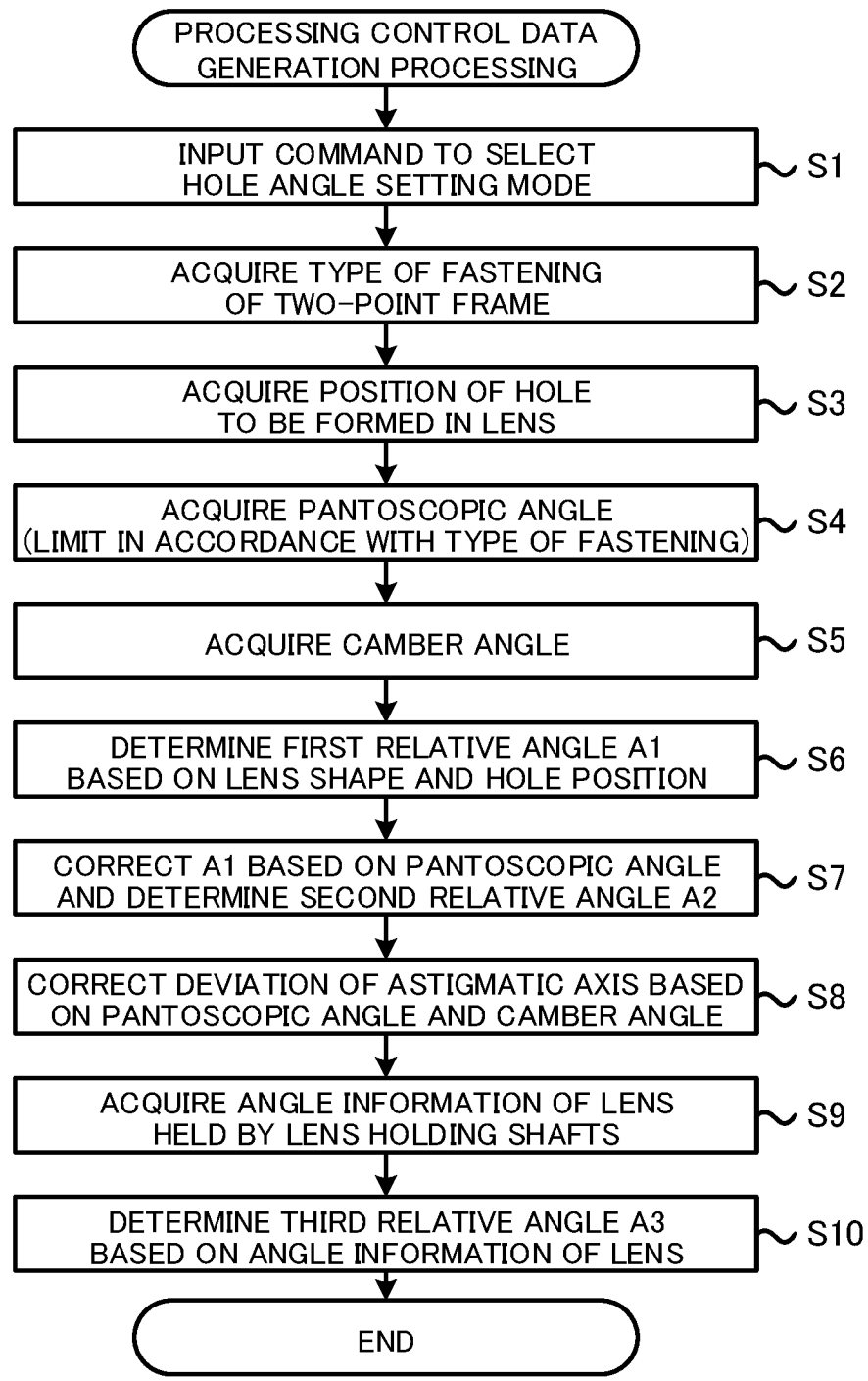
FIG. 4 is a flowchart of processing control data generation processing.
Figure 5:
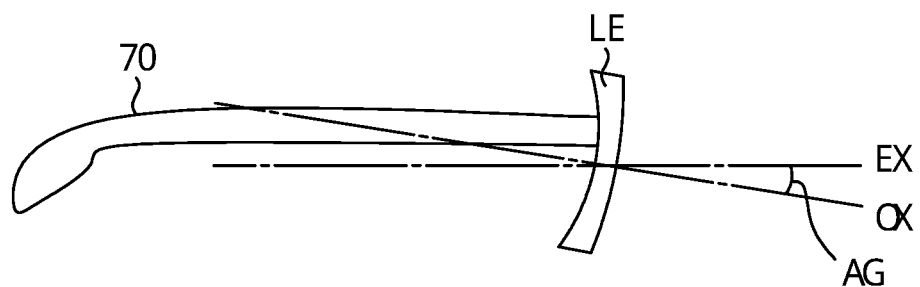
FIG. 5 is a side view of spectacles in a state of being worn by a user.
Figure 6:
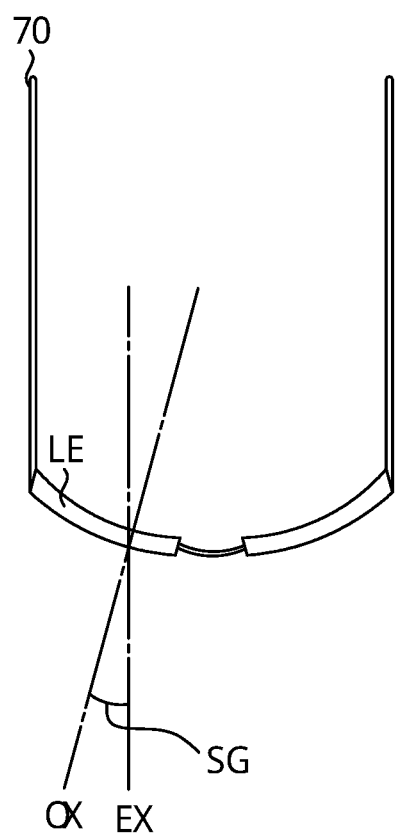
FIG. 6 is a plan view of the spectacles in the state of being worn by the user.
Figure 7:
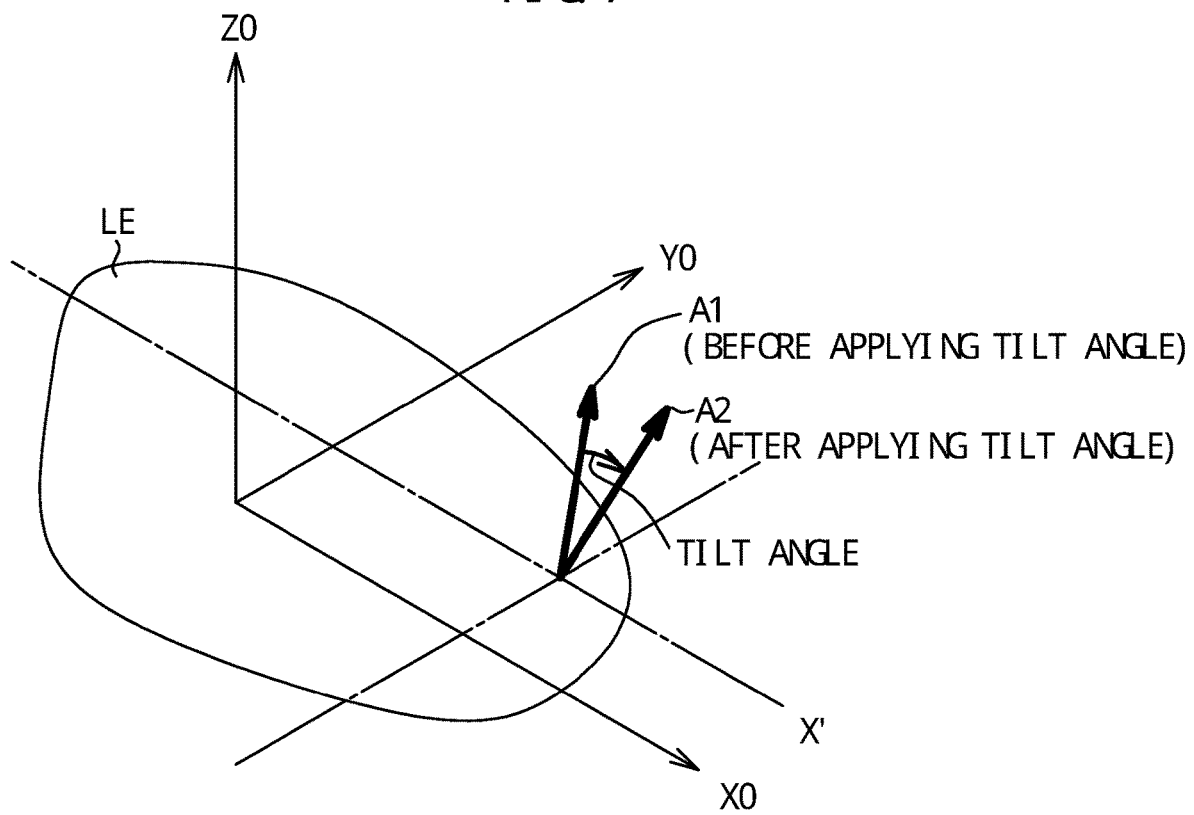
FIG. 7 is a schematic view showing a relationship between a first relative angle A1 before a pantoscopic angle is applied and a second relative angle A2 after the pantoscopic angle is applied.

The RAM 6 temporarily stores various pieces of information. The ROM 7 stores various programs, initial values, and the like. The non-volatile memory 8 is a non-transitory storage medium (for example, a flash ROM, a hard disk drive, or the like) that can hold storage content even if a supply of a power source is cut off. The non-volatile memory 8 may store a control program used to control an operation of the spectacle lens processing device 1 (a processing control data generation program used to execute processing control data generation processing shown in FIG. 4, and the like, for example). The operation unit 50 receives input of various commands from an operator. For example, a touch panel provided in the surface of the display 55, an operation button, or the like may be used as the operation unit 50. The display 55 may display various pieces of information, such as the shape of the lens LE, the shape of a frame, and the like. The external communication I/F 59 connects the spectacle lens processing device 1 to an external device.

The CPU 5 appropriately processes the lens LE by controlling driving of the various motors and the like in accordance with processing control data. For example, in the present embodiment, the spectacle lens processing device 1 itself generates the processing control data. Specifically, in the present embodiment, a control unit (including the CPU 5) of the spectacle lens processing device 1 generates at least part of the processing control data by executing the processing control data generation program. In other words, in the present embodiment, the spectacle lens processing device 1 also functions as a data generation device that generates the processing control data. However, a device other than the spectacle lens processing device 1 may function as the data generation device. For example, a personal computer connected to the spectacle lens processing device 1 may function as the data generation device. In this case, the processing control data may be generated by a control unit of the personal computer executing the processing control data generation program. A plurality of control units may execute the processing control data generation program.

The processing control data generation processing performed by the control unit (the CPU 5) of the present embodiment will be explained with reference to FIG. 4 to FIG. 9. In the processing control data generation processing exemplified in FIG. 4 to FIG. 9, when the drilling tool 440 is used to form the hole in the lens LE, at least the relative angle between the drilling tool 440 and the lens LE is determined. The angle of the hole formed in the lens LE is determined depending on the relative angle between the drilling tool 440 and the lens LE. Thus, in the following explanation, the relative angle between the drilling tool 440 and the lens LE is also referred to as a "hole angle."

First, the CPU 5 inputs a command, from the operator, to select a hole angle setting mode (S1). The hole angle setting mode is a mode that specifies a specific setting method of the hole angle. For example, in the present embodiment, the operator may select one of the hole angle setting modes that include "Use lens to be processed," "Use demonstration lens," "Edge angle," and "Specify desired angle." For example, the CPU 5 may input the command used to select the hole angle setting mode by prompting the operator to operate the operation unit 50 in a state in which the plurality of hole angle setting modes are displayed on the display 55.

In the "Use lens to be processed" mode, a basic hole angle (a hole angle before correction is performed on the basis of a pantoscopic angle and the angle of the lens LE) is set such that the angle of the hole to be formed (namely, the angle of the drilling direction by the drilling tool) is perpendicular with respect to the surface of the lens LE to be processed. In the "Use demonstration lens" mode, the basic hole angle is set such that the angle of the hole to be formed is perpendicular with respect to a demonstration lens that was mounted on a rimless frame. In the "Edge angle" mode, the specific hole angle is set such that the angle of the hole is a predetermined angle with respect to an angle of an edge portion of the lens LE to be processed. A configuration may be adopted in which the angle of the hole with respect to the angle of the edge portion can be changed. In the "Specify desired angle" mode, the operator may specify a desired angle of the hole with respect to the lens LE. Hereinafter, cases will be explained when the mode is selected in which the basic hole angle is set on the basis of the lens shape (namely, one of the "Use lens to be processed" mode, the "Use demonstration lens" mode, and the "Edge angle" mode).

When the "Use lens to be processed" mode and the "Use demonstration lens" mode are selected, the CPU 5 may identify the shape of the lens surface using a given method. For example, the CPU 5 may identify the surface shape of the lens on the basis of a curve value of the lens, or may identify the surface shape of the lens on the basis of a radius of curvature of a surface curve. Information relating to the surface shape of the lens may be input by the operator or may be acquired as a result of measuring the shape of the lens LE using the lens shape measurement unit 200, for example.

Next, the CPU 5 acquires information relating to a type of fastening provided on the rimless frame (S2). As the information relating to the type of fastening, the CPU 5 may acquire at least one of a number of pins inserted into the holes formed in the lens LE, an arrangement of the pins when a plurality of the pins are provided, the presence/absence of a wraparound endpiece that is in contact with an edge portion of the lens LE, a contact position of the wraparound endpiece on the lens LE, and the like.

Next, the CPU 5 acquires a position of the hole formed in the lens LE (S3). For example, in the present embodiment, the CPU 5 acquires the position of the hole in the front surface of the lens LE, when the lens LE is seen from a front side in the optical axis direction of the lens LE. The method of acquiring a hole position by the CPU 5 may be selected as appropriate. For example, the CPU 5 may prompt the operator to specify the hole position by operating the operation unit 50. The CPU 5 may acquire the hole position by acquiring information about a distance from an edge of the lens LE to the hole. Further, the CPU 5 may acquire, as the position of the hole formed in the lens LE, a position of a hole of a demonstration lens that was mounted on the rimless frame.

Next, the CPU 5 acquires information about the pantoscopic angle (S4). The pantoscopic angle is an angle in a vertical plane between the visual axis of a user and the optical axis of the lens LE, when the user is wearing spectacles in which the lens LE after processing is mounted and is looking to the front. As shown by a side view of spectacles 70 in FIG. 5, when a visual axis of the user looking forward is EX, and an optical axis of the lens LE is OX, an angle AG between EX and OX in the vertical plane (the angle when seen from the side) is the pantoscopic angle. In general, the pantoscopic angle is mostly adjusted such that the optical axis OX of the lens LE is tilted more to the front and diagonally downward than the visual axis EX. Thus, the pantoscopic angle is also referred to as a forward tilt angle. In "JIS T 7330," the forward tilt angle is defined as being "an angle in a vertical plane between an optical axis of a lens and a visual axis (normally, a horizontal direction) of an eye in a first eye position." Further, a vertical plane with respect to a front surface direction of the spectacles is the "vertical plane," and a flat surface that touches a point of the lens surface of the lens LE through which the optical axis passes is a "lens reference plane." In this case, the pantoscopic angle may be expressed by an angle between the vertical plane and the lens reference plane when the spectacles are seen from the side direction.

In the present embodiment, the operator that performs the processing of the lens LE specifies the appropriate pantoscopic angle by operating the operation unit 50. At S4, the CPU 5 acquires the pantoscopic angle specified by the operator. Thus, the operator may set the appropriate pantoscopic angle in accordance with a mode of use of the spectacles and the like. The method by which the operator specifies the pantoscopic angle may be selected as appropriate. For example, the operator may directly input a value of the pantoscopic angle. The operator may select one of a plurality of candidate values for the pantoscopic angle (5 degrees, 10 degrees, 15 degrees, and the like, for example). Alternatively, the operator may select one of a plurality of usage modes of the spectacles (for far vision, habitual use, for near vision, and the like, for example). In this case, the appropriate pantoscopic angles may be associated in advance with the respective usage modes.

At S4 of the present embodiment, the CPU 5 limits a range over which the pantoscopic angle can be adjusted in accordance with the type of the fastening acquired at S2. For example, when the plurality of pins are inserted into the holes of the lens LE, it is likely to be more difficult to adjust the pantoscopic angle in comparison to a case in which the single pin is used. Even when the plurality of pins are used, if the plurality of pins are aligned in the vertical direction, the adjustment of the pantoscopic angle is even more difficult than in a case in which the plurality of pins are aligned in the horizontal direction. In addition, when the contact position of the wraparound endpiece on the lens LE is the upper portion or the lower portion of the lens LE, the pantoscopic angle is difficult to adjust in comparison to a case in which the contact positions are the left and right of the lens LE. By limiting the range over which the pantoscopic angle can be adjusted in accordance with the type of the fastening, the CPU 5 of the present embodiment can reduce a possibility of forming, in the lens LE, the hole that is not suited to the type of fastening. The range over which the pantoscopic angle can be adjusted may be set in advance in accordance with the type of fastening, or may be settable by the operator for each of the types of the fastening. Further, a limit on the range over which the pantoscopic angle can be adjusted may include prohibiting the adjustment of the pantoscopic angle when the fastening is a specific type.

Next, the CPU 5 acquires information about a camber angle (S5). The camber angle is an angle in a horizontal plane between the visual axis of the user and the optical axis of the lens LE, when the user is wearing the spectacles in which the lens LE after processing is mounted and is looking to the front. As shown by a plan view of spectacles 60 in FIG. 6, an angle SG between the visual axis EX of the user looking forward and the optical axis OX of the lens LE in the horizontal plane (the angle when seen from above) is the camber angle. Further, when the above-described "vertical plane" and the "lens reference plane" are used, the camber angle may also be expressed by an angle between the vertical plane and the lens reference plane when the spectacles are seen from above or below.

Next, on the basis of the lens shape and the hole position, the CPU 5 determines a first relative angle A1 that is the basic hole angle (S6). In the present embodiment, as described above, the first relative angle A1 is determined in accordance with the hole angle setting mode selected by the operator. Specifically, when one of the "Use lens to be processed" mode, the "Use demonstration lens" mode, and the "Edge angle" mode is selected as the hole angle setting mode, the first relative angle A1 is determined on the basis of the surface shape of the lens (the lens LE to be processed or the demonstration lens) or the shape of the edge portion, and the hole position. When the "Specify desired angle" mode is selected, the first relative angle A1 is the angle specified by the operator. As described above, the first relative angle A1 is a provisional relative angle before correction is performed on the basis of the pantoscopic angle and the angle of the lens LE. Further, at S6 of the present embodiment, the relative angle A1 between the drilling tool 440 and the lens LE is determined on the assumption that a deviation does not occur in the angle of the lens LE held by the lens holding shafts 102R and 102L. More specifically, at S6 of the present embodiment, the provisional relative angle A1 between the drilling tool 440 and the lens LE is determined when the lens LE is held by the lens holding shafts 102R and 102L at the optic center (the optical center of the lens LE).

Next, by correcting the first relative angle A1 on the basis of the pantoscopic angle, the CPU 5 determines a second relative angle A2 to which the pantoscopic angle is applied (S7). A method to determine the relative angle on the basis of the pantoscopic angle (the second relative angle A2 in the present embodiment) will be explained with reference to FIG. 7. In an example shown in FIG. 7, an axis that intersects the lens surface of the lens LE is a ZO axis. An axis that perpendicularly intersects the ZO axis and extends in the horizontal direction is an XO axis. An axis that perpendicularly intersects both the ZO axis and the XO axis is a YO axis. The pantoscopic angle is the angle that causes the lens LE to be tilted forward or tilted backward. Thus, the second relative angle A2 to which the pantoscopic angle is applied can be determined by rotating a vector indicating the first relative angle A1 by an amount corresponding to the pantoscopic angle, around an axis X' (the axis extending in the horizontal direction) that is parallel to the XO axis and that passes through the hole position.

An example of a calculation formula to obtain the second relative angle A2 to which the pantoscopic angle has been applied will be explained. First, in the present embodiment, a vector is broken down into two angle components. For example, an angle component that is formed between a straight line passing through a frame center (a geometrical center of the lens shape) of the lens LE after processing and the hole position, and a vector of a direction of the hole (which is dependent on the relative angle) is θ. Further, an angle component of a direction of rotation around an axis that passes through the hole position and that is parallel to the ZO axis is Φ. By dividing the vector of the direction of the hole into the two angle components (θ and Φ), the calculation of the relative angle can be easier. A method to divide the vector into the two angle components may be changed. For example, the vector may be divided into an angle component of a direction parallel to the XO axis, and an angle component of a direction parallel to the YO axis. A position of the frame center may be obtained, for example, as a center in the left-right direction and a center in the up-down direction of the lens shape. Further, a center of a box when the lens shape is enclosed by a square box (a boxing center) may be obtained as the position of the frame center.

When the first relative angle A1 is divided into (θ1 and Φ1), the second relative angle A2 (θ2 and Φ2) to which the pantoscopic angle is applied is obtained using the calculation Formulas (1) and (2) below, for example. The calculation formulas may be changed.

$$\theta 2 \approx \theta 1 + (\text{constant} \times \text{pantoscopic angle}) \quad (1)$$

$$\Phi 2 \approx \Phi 1 - (\text{constant} \times \text{pantoscopic angle} \times \text{pantoscopic angle}) \quad (2)$$

Next, when the lens LE is a lens that corrects astigmatism, the CPU 5 corrects a deviation of an astigmatic axis of the lens LE, which changes in accordance with the pantoscopic angle, on the basis of the values of the pantoscopic angle and the camber angle (S8). When the pantoscopic angle is changed, the direction of the astigmatic axis of the lens LE that is processed and mounted on the rimless frame may deviate from an appropriate direction. Furthermore, the larger the camber angle is, the larger the deviation of the astigmatic axis is when the pantoscopic angle is changed. Thus, by correcting the deviation of the astigmatic axis on the basis of the values of the pantoscopic angle and the camber angle, the deviation of the astigmatic axis can be appropriately suppressed.

An example of a calculation formula to obtain a correction amount of the deviation of the astigmatic axis, and an example of a correction method will be explained. The correction amount of the deviation of the astigmatic axis is calculated using the calculation Formula (3) below, for example. The calculation formula may be changed.

$$\text{Correction amount of deviation of astigmatic axis} \approx \text{constant} \times \text{pantoscopic angle} \times \text{camber angle} \quad (3)$$

A specific method to correct the deviation of the astigmatic axis on the basis of the obtained correction amount may be selected as appropriate. For example, the CPU 5 may cause the angle of the astigmatic axis of the lens LE to be offset by an amount corresponding to the correction amount, from the angle of the astigmatic axis before the correction when the lens LE is caused to be held by the lens holding shafts 102R and 102L. The CPU 5 may correct the deviation of the astigmatic axis by rotating a layout of the lens shape on the lens LE by an amount corresponding to the correction amount. In these cases, the CPU 5 may rotate the angle of the astigmatic axis of the lens LE, or the layout of the lens shape, using the optic center of the lens LE as a center. The CPU 5 may reduce the deviation of the astigmatic axis by changing the relative angle between the drilling tool and the lens LE. The CPU 5 may reduce the deviation of the astigmatic axis by changing the relative angle and the position of the hole.

Next, the CPU 5 acquires angle information of the lens LE when the lens LE is actually held by the lens holding shafts 102R and 102L (in other words, the angle information of the lens LE after the lens LE is held by the lens holding shafts 102R and 102L) (S9). For example, the CPU 5 of the present embodiment acquires a measurement result of the shape of the lens LE held by the lens holding shafts 102R and 102L and acquires the angle information of the lens LE on the basis of the acquired measurement result. In the present embodiment, the shape of the lens LE is measured using the lens shape measurement unit 200 provided in the spectacle lens processing device 1. However, the CPU 5 may acquire the information about the shape of the lens LE measured by an external device (a lens shape measurement device, for example), via wired communication, wireless communication, a detachable memory, or the like.

An example of a method to acquire the angle information of the lens LE from the measurement result of the shape of the held lens LE will be explained with reference to FIG. 8 and FIG. 9. In the present embodiment, the CPU 5 acquires the measurement result (a result of measuring the surface shape along the lens shape formed on the lens LE, for example) of the surface shape (at least one of the front surface and the rear surface) of the held lens LE. Next, the CPU 5 applies a virtual sphere 75 that follows the surface shape of the lens LE, and identifies a center position O of the virtual sphere 75. Further, the CPU 5 identifies a straight line OH that passes through the center position O of the virtual sphere 75 and a contact position (a chuck position) H of the lens holding shafts 102R and 102L on the lens LE.

Figure 8:
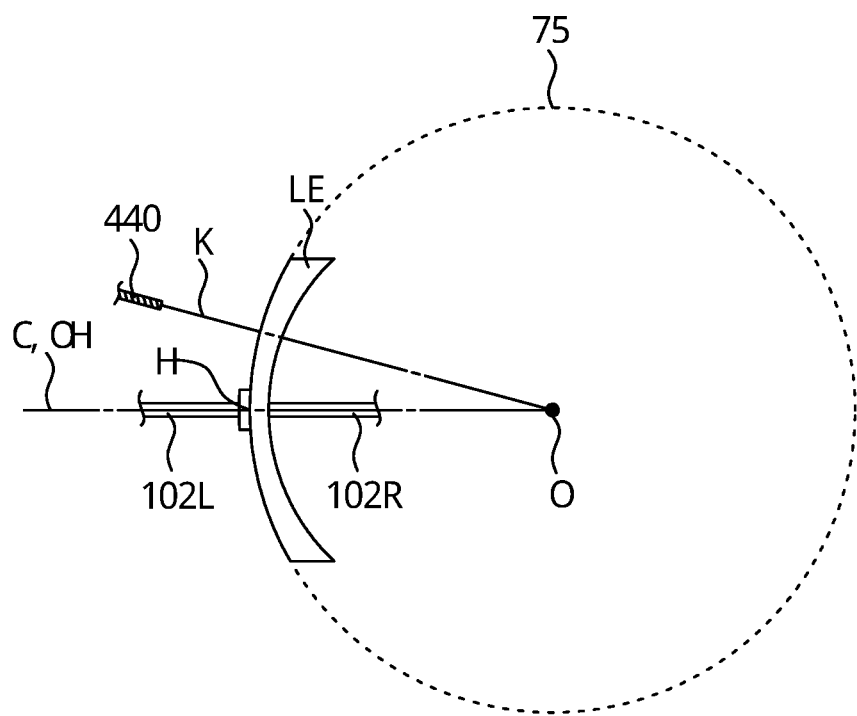
FIG. 8 is a view showing a state in which lens holding axes 102R and 102L are holding a lens LE at an optic center thereof.

FIG. 8 shows a state in which the lens holding shafts 102R and 102L are holding the lens LE by sandwiching the lens LE at the optic center thereof. In this case, the lens holding shafts 102R and 102L are perpendicularly in contact with the front surface and the rear surface of the lens LE, and thus, the angle of the held lens LE is not likely to change. Thus, in the example shown in FIG. 8, the center position O of the virtual sphere 75 is positioned on a holding axis line C of the lens holding shafts 102R and 102L. Specifically, in the example shown in FIG. 8, the straight line OH is aligned with the holding axis line C. As described above, the first relative angle A1 and the second relative angle A2 determined in the present embodiment (namely, the relative angles for which the deviation of the angle of the held lens LE is not corrected) are the relative angles between the drilling tool 440 and the lens LE when the lens LE is held at the optic center thereof by the lens holding shafts 102R and 102L. As a result, in the state shown in FIG. 8, there is no need to correct a drilling direction K of the drilling tool 440 with respect to the lens LE.

Figure 9:
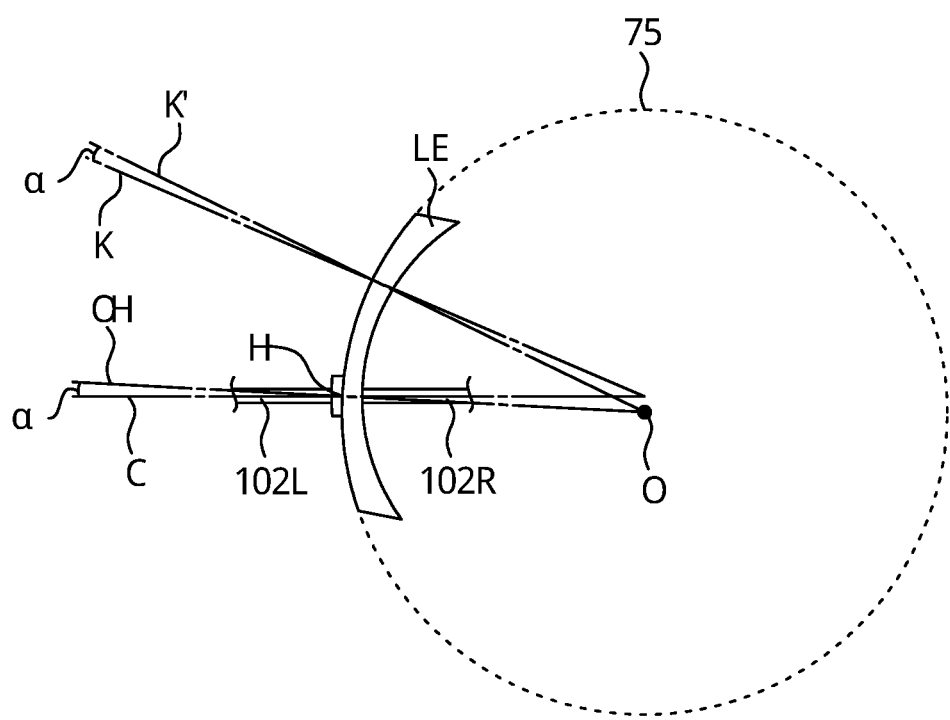
FIG. 9 is a view showing a state in which the lens holding axes 102R and 102L are holding the lens LE at a position that is not the optic center.

FIG. 9 shows a state in which the lens holding shafts 102R and 102L are holding the lens LE by sandwiching the lens LE at a position other than the optic center thereof. In many cases, a curve of the front surface and a curve of the rear surface of the lens LE are different. Thus, when the lens LE is held at the position other than the optic center, the lens holding shafts 102R and 102L are not often perpendicularly in contact with the front surface and the rear surface of the lens LE. In this case, the angle of the held lens LE may change. In the example shown in FIG. 9, as a result of the angle of the lens LE having changed, the center position O of the virtual sphere 75 is not positioned on the holding axis line C. In other words, the straight line OH and the holding axis line C intersect each other.

The CPU 5 of the present embodiment acquires, as the angle information, a deviation of the angle of the lens LE actually held by the lens holding shafts 102R and 102L with respect to the angle of the lens LE when the lens LE is held by the lens holding shafts 102R and 102L at the optic center thereof (refer to FIG. 8). For example, the CPU 5 of the present embodiment acquires, as the angle information, a deviation α (refer to FIG. 9) of the angle of the straight line OH with respect to the holding axis line C.

A method to acquire the angle information of the lens LE may be changed. For example, from the measurement results of the shape of the held lens LE, the CPU 5 may identify positions of a plurality of points (three points or more, for example) of a ridge portion (a ridge portion forming a boundary between the lens front surface and the lens side surface, for example) of the lens LE held by the lens holding shafts 102R and 102L. In this case, the CPU 5 may identify a reference plane that passes through the identified plurality of points. When the lens LE is being held at the optic center thereof by the lens holding shafts 102R and 102L, the reference plane is perpendicular to the holding axis line C. Meanwhile, if the angle of the held lens LE changes, the reference plane is not perpendicular to the holding axis line C. Thus, the CPU 5 can acquire the angle information of the lens LE on the basis of the angle of the reference plane. For example, the CPU 5 may acquire, as the angle information, a deviation of an angle between a normal line of the reference plane and the holding axis line C.

Next, the CPU 5 determines, on the basis of the angle information of the lens LE, a third relative angle A3 that takes into account the angle of the held lens LE (S10). For example, the CPU 5 of the present embodiment determines the third relative angle A3 by correcting the provisional relative angle (the second relative angle A2 in the present embodiment) when the lens LE is held at the optic center thereof, in accordance with the deviation α of the angle of the held lens LE.

As shown in FIG. 9, if the provisional relative angle when the lens LE is held at the optic center thereof remains as it is, the drilling direction K of the drilling tool 440 may deviate from the appropriate angle. Therefore, the CPU 5 rotates the drilling direction K that does not take account of the angle deviation, by an amount corresponding to the deviation α of the angle of the lens LE, and thus determines a drilling direction K' to be used when actually forming the hole. The relative angle between the drilling direction K' and the lens LE is the third relative angle A3.

The CPU 5 generates the processing control data such that the relative angle between the drilling tool 440 and the lens LE when performing the drilling processing is the relative angle A3. The CPU 5 can form the hole of the appropriate angle in the lens LE by controlling the processing operation in accordance with the generated processing control data.

The above-described embodiment is merely an example of the disclosed technology. Thus, the technology exemplified in the above-described embodiment may be changed. First, only a part of the processing control data generation processing (refer to FIG. 4) exemplified in the above-described embodiment may be realized. For example, the CPU 5 may determine the relative angle, without taking into account the change in the angle of the held lens LE, only taking into account the pantoscopic angle. In this case, the CPU 5 may omit the processing at S9 and S10 in FIG. 4. In contrast, the CPU 5 may determine the relative angle, without taking into account the pantoscopic angle, only taking into account the changes in the angle of the held lens LE. In this case, the CPU 5 may omit at least one of S2, S4, S5, S7 and S8 in FIG. 4. At S10 in the present embodiment, the third relative angle A3 is determined by correcting the second relative angle A2 in accordance with the deviation α of the angle of the lens LE. However, when the processing at S7 is omitted, the CPU 5 may determine the third relative angle A3 by correcting the first relative angle A1 in accordance with the deviation α.

At S6 and S7 of the above-described embodiment, the CPU 5 determines the first relative angle A1 on the basis of the shape of the lens LE and the position of the hole, and determines the second relative angle A2 to which the pantoscopic angle is applied by correcting the first relative angle A1 on the basis of the pantoscopic angle. However, the CPU 5 may directly determine the relative angle to which the pantoscopic angle is applied, without performing the processing to determine the provisional relative angle. Similarly, at S10 of the above-described embodiment, the CPU 5 determines the relative angle A3 to which the change in the angle of the held lens LE is applied, by correcting the provisional relative angle when the lens LE is held at the optic center thereof, on the basis of the angle information of the lens LE. However, the CPU 5 may directly determine the relative angle to which the change in the angle of the lens LE is applied, without performing the processing to determine the provisional relative angle.

In the above-described embodiment, the CPU 5 acquires the angle information of the lens LE held by the lens holding shafts 102R and 102L and determines the relative angle on the basis of the angle information. However, the CPU 5 may determine the relative angle to which the change in the angle of the lens LE is applied without acquiring the angle information of the lens LE. For example, while sequentially referring to the measurement results of the shape of the held lens LE, the CPU 5 may change the angle of at least one of the drilling tool 440 and the lens holding shafts 102R and 102L until the relative angle between the lens LE and the drilling tool 440 becomes the appropriate angle. In this case also, the appropriate relative angle can be determined on the basis of the angle of the held lens LE.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A spectacle lens processing device comprising:
a drilling tool that forms a hole in a lens; and
a processor that is configured to:
acquire a position of the hole to be formed in the lens,
acquire a pantoscopic angle, the pantoscopic angle being an angle in a vertical plane between a visual axis of a user and an optical axis of the lens when the user wears spectacles in which the lens after processing is mounted and faces forward,
determine, based on the acquired pantoscopic angle, a relative angle between the drilling tool and the lens when the hole is formed in the lens in the position of the hole,
determine the relative angle based on one of a shape of the lens to be processed and a shape of a demonstration lens mounted in a rimless frame, on the acquired position of the hole, and on the acquired pantoscopic angle,
determine a provisional relative angle between the drilling tool and the lens based on one of the shape of the lens to be processed and the shape of the demonstration lens mounted in the rimless frame, and on the acquired position of the hole, and
determine the relative angle with which the hole is to be actually formed, by correcting the provisional relative angle based on the acquired pantoscopic angle.

2. The spectacle lens processing device according to claim 1, wherein
the processor is configured to acquire the pantoscopic angle specified by an operator operating an operation unit.

3. A spectacle lens processing device comprising:
a drilling tool that forms a hole in a lens; and
a processor configured to:
acquire a position of the hole to be formed in the lens,
acquire a pantoscopic angle, the pantoscopic angle being an angle in a vertical plane between a visual axis of a user and an optical axis of the lens when the user wears spectacles in which the lens after processing is mounted and faces forward, and
determine, based on the acquired pantoscopic angle, a relative angle between the drilling tool and the lens with which the hole is to be formed in the lens at the position of the hole,
acquire a camber angle, the camber angle being an angle in a horizontal plane between the visual axis of the user and the optical axis of the lens when the user wears the spectacles in which the lens after processing is mounted and faces forward, and
correct, based on values of the pantoscopic angle and the camber angle, a deviation in an astigmatic axis of the lens that changes in accordance with the pantoscopic angle.

4. The spectacle lens processing device according to claim 1, wherein
the processor is further configured to limit an adjustable range of the pantoscopic angle, in accordance with a type of fastening of the rimless frame, the fastening being to be inserted into the hole formed in the lens and to fix the lens.

5. The spectacle lens processing device according to claim 1, further comprising:
a lens holding shaft that sandwiches and holds the lens, wherein
the processor is configured to determine the relative angle based on an angle of the lens held by the lens holding shaft.

6. A spectacle lens processing device comprising:
a drilling tool that forms a hole in a lens;
a lens holding shaft that sandwiches and holds the lens; and
a processor operatively connected to a memory storing computer program code,
wherein
the computer program code and the memory are configured, with the processor, to cause the spectacle lens processing device to:
acquire a position of the hole to be formed in the lens;
determine, with an assumption that a deviation of an angle does not arise in the lens held by the lens holding shaft, a provisional relative angle between the drilling tool and the lens with which the hole is to be formed in the lens at the position of the hole;
acquire angle information of the lens that is actually held by the lens holding shaft; and
determine a relative angle between the drilling tool and the lens with which the hole is to be formed by correcting the provisional relative angle in accordance with a deviation of an angle that actually arises in the lens held by the lens holding shaft.

7. The spectacle lens processing device according to claim 6, wherein
the angle information is obtained by measuring a shape of the lens held by the lens holding shaft.

8. The spectacle lens processing device according to claim 7, wherein
the processor is configured to:
acquire the deviation of angle of the lens that actually arises in held by the lens holding shaft, with respect to an angle of the lens that is held at an optic center of the lens by the lens holding shaft, and
determine the relative angle based on the acquired deviation of the angle.

9. The spectacle lens processing device according to claim 8, wherein
the processor is configured to:
determine the provisional relative angle between the drilling tool and the lens that is held at the optic center of the lens by the lens holding shaft.

10. A non-transitory computer-readable medium storing computer-readable instructions that, when executed by a processor of a data generation device to generate processing control data used in a spectacle lens processing device including a drilling tool that forms a hole in a lens, cause the data generation device to perform steps comprising:
acquiring a position of the hole to be formed in the lens;
acquiring a pantoscopic angle, the pantoscopic angle being an angle in a vertical plane between a visual axis of a user and an optical axis of the lens when the user wears spectacles in which the lens after processing is mounted and faces forward;
determining, based on the acquired pantoscopic angle, a relative angle between the drilling tool and the lens with which the hole is to be formed in the lens at the position of the hole;
determining the relative angle based on one of a shape of the lens to be processed and a shape of a demonstration lens mounted in a rimless frame, on the acquired position of the hole, and on the acquired pantoscopic angle;
determining a provisional relative angle between the drilling tool and the lens based on one of the shape of the lens to be processed and the shape of the demonstration lens mounted in the rimless frame, and on the acquired position of the hole; and
determining the relative angle with which the hole is to be actually formed, by correcting the provisional relative angle based on the acquired pantoscopic angle.

11. A non-transitory computer-readable medium storing computer-readable instructions that, when executed by a processor of a data generation device to generate processing control data used in a spectacle lens processing device including: a drilling tool that forms a hole in a lens; and a lens holding shaft that sandwiches and holds the lens, cause the data generation device to perform steps comprising:
acquiring a position of the hole to be formed in the lens;
determining, with an assumption that a deviation of an angle does not arise in the lens held by the lens holding shaft, a provisional relative angle between the drilling tool and the lens with which the hole is to be formed in the lens at the position of the hole;
acquiring angle information of the lens that is actually held by the lens holding shaft; and
determining a relative angle between the drilling tool and the lens with which the hole is to be formed by correcting the provisional relative angle in accordance with a deviation of an angle that actually arises in the lens held by the lens holding shaft.

* * * * *